Patented Feb. 6, 1951

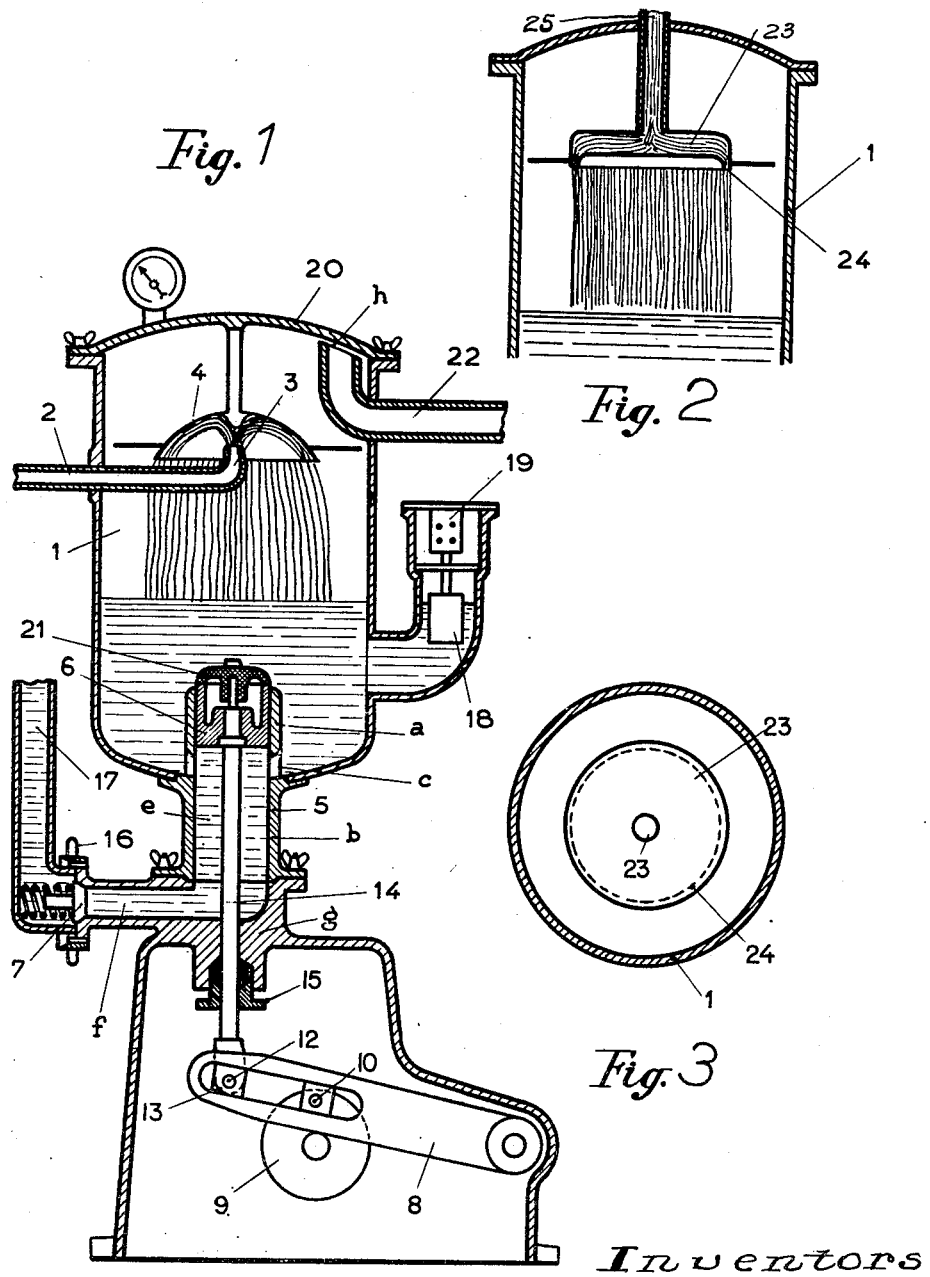

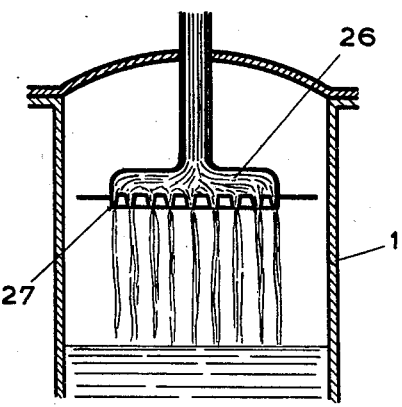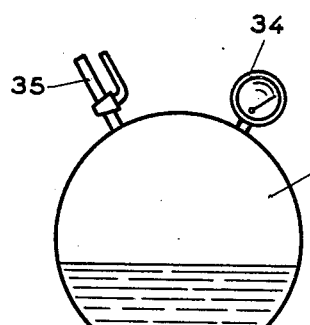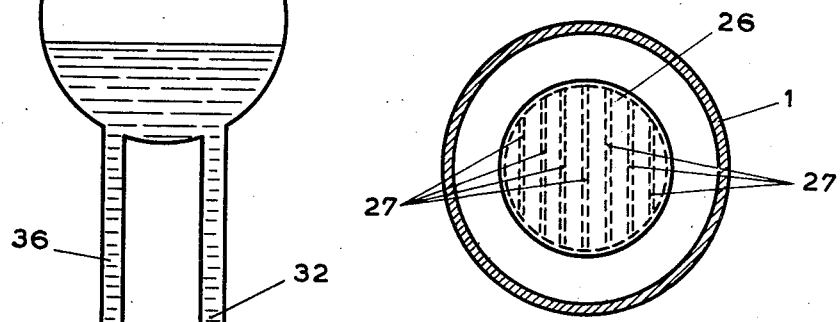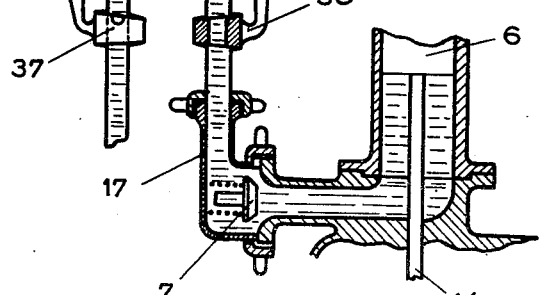

2,540,390

UNITED STATES PATENT OFFICE 2,540,390

APPARATUS FOR DEAERATING LIQUIDS

Jean Gorgerat, Rosny-sous-Bois, and René Détrez, Nogent-sur-Marne, France; Jeanne Blanche Marguerite Perrin, Jeanne Helene Sophie Gorgerat, and Liliane Julie Gorgerat Chambault, heiresses of the estate of said Jean Gorgerat, deceased, assignors to said René Détrez Application October 30, 1945, Serial No. 625,598
In France May 19, 1943

Section 1, Public Law 690, August 8, 1946
Patent expires May 19, 1963

7 Claims. (Cl. 103—203)

The present invention relates to an apparatus intended for deaerating liquids such as liquid foods, pharmaceutical, chemical liquids and the like.

The apparatus according to the invention can be used for all liquids in which it is necessary, for any reason, to remove the air or any other gas which they contain.

It can be used, more particularly, for fruit juices and similar liquids and especially when said liquids must be heated, as is the case when they are pasteurized either before or after they are bottled. It is well known, indeed, that the vitamines contained in said liquids are exceedingly sensible to oxygen and particularly when the liquid is brought to a higher temperature.

It is desirable, therefore, to remove the air from the juices immediately before the pasteurization if this operation precedes the filling operation or immediately before the filling operation if the pasteurization is effected after the bottling.

Apparatuses are already known which effect the deaerating of said liquids but they offer the following disadvantages: either they remove only an insufficient portion of the air contained in the liquids to be deaerated or degassed, or they require valve opening and closing manipulations involving chances or risks of back feed of the air into the liquid or into the apparatus, or they cannot be conveniently disassembled and cleaned.

The apparatus which forms the subject matter of the invention has been devised for the purpose of permitting an effective deaerating or degassing of the liquids while avoiding the above mentioned disadvantages as much as possible.

Said apparatus essentially comprises a vacuum vat internally receiving the liquid to be deaerated or degassed in its upper part and comprising in its lower part a pump for removing the deaerated or degassed liquid, said unit being characterized by the following features, taken individually or in any combination:

1. A distributing member arranged inside the vat and towards the upper part of the latter receives under pressure the liquid to be deaerated and causes the latter to pass downwardly in one or more thin films, this result being obtained preferably: either by throwing the liquid under pressure upwardly against a cup-shaped distributor secured to the upper part of the vacuum vat or by bringing said liquid under pressure into a chamber-shaped distributor provided under its lower face with one or more narrow slots through which the liquid to be deaerated escapes and is expelled downwards.

2. A pump body made fast with the bottom of the vacuum vat is arranged so that the upper part of said pump body lies inside the vacuum vat while the lower part of said pump body lies outside said vat, the upper part of said pump body being provided with ports or openings making it possible for the deaerated liquid which is to be removed to pass by gravity from the vacuum vat into the pump body.

3. The deaerated liquid falling down onto the bottom of the vacuum vat is removed by a volumetric pump through the thrust of the lower face of a piston sliding in the pump body.

4. The expelling piston sliding in the pump body is arranged so that it forms during the discharging step a partition between the inside of the vacuum vat and the delivery chamber or piping.

5. The pump body is rendered fast with the bottom of the vacuum vat by its cylinder-forming portion, the so formed unit, which is removably secured to the lower part of the pump body, being arranged so that it can be separated from said latter part in order to expose the parts to be cleaned.

6. A valve sucks out of the vacuum vat by one of its upwardly directed openings and directly under the cover of said vat the air escaping from the liquid to be deaerated, the distributing member forming a partition wall opposing the rising back of the liquid into the suction zone of the valve.

Various forms of execution of the invention will be described now and are shown diagrammatically by way of non-limitative examples in the appended drawings, in which:

Figure 1 is a general vertical and diametral sectional view of a deaerator according to the invention.

Figures 2 and 3 are a sectional and a plan view respectively of a modification of the distributing member the purpose of which is to cause the falling down of the liquid, while Figures 4 and 5 are views corresponding to Figures 2 and 3 respectively and showing another modification, and Figure 6 is a view of an anti-pulsating device placed at the outlet for the deaerated liquid.

In the apparatus shown in Figure 1 the falling down of the liquid in a thin film is obtained by means of a cup-shaped distributor.

The liquid to be deaerated enters the vacuum vat 1 through the pipe-branch 2 and escapes through the nozzle 3. The liquid arriving under pressure (either through a level difference or otherwise) strikes against the cup 4 the form of which is established especially so that the liquid flows and falls in a thin film traversing the inside of the vacuum vat 1 downwardly while abandoning the air which it contains.

In the lower part of the vacuum vat 1 a pump body 5 can be seen which is made fast with said vat and arranged so that the upper part $a$ of said pump body lies inside the vat 1 while the lower part $b$ of said pump body lies outside the said vat.

It is also to be noted that the upper part $a$ of the pump body 5 which is located inside the vacuum vat 1 comprises openings $c$ towards the bottom of said vat. Said openings make it possible for the deaerated liquid which falls onto the bottom of the vat to flow into the pump body at the right moment and to be discharged by the lower part of the piston 6 during the downward stroke of the latter.

It is to be noted and this is exceedingly important that the discharge is obtained volumetrically and not through a suction. The liquid is thus delivered in an absolute positive manner and this arrangement makes it possible to work with very far reaching vacuums approximating the absolute vacuum. It is well known this is practically impossible with voiding pumps working through a suction.

It is still to be noted that from the moment at which the deaerated liquid begins to be discharged the piston 6 acts as a partition wall between the vacuum vat 1 and the delivery chamber $e$ of the pump body 5. This particular arrangement permits of dispensing with every valve and insures a high simplicity of working and of construction.

Another particular point to be noted is the design of the pump body and its arrangement with respect to the vacuum vat, said design and arrangement being such that during the return stroke of the piston 6 said piston is submitted to the atmospheric pressure neither on its upper nor on its lower face, which permits a good balance of the mechanical working and reduces the risks of wear.

The discharge of the deaerated liquid is insured, as already mentioned, by the piston 6 which forces the liquid towards the outlet $f$ of the pump body 5, said outlet being closed by a valve flap 7 as soon as the pressure of the piston 6 ceases. Said valve 7 prevents back feed of air into the pump body.

The reciprocating motion of the piston 6 is produced by a connecting rod 8 actuated by a disc-crank 9 with an adjustable crank pin 10. The motion of the connecting rod 8 is transmitted to the piston 6 by a strap 12 provided with a sliding block 13, the strap 12 being connected with the piston 6 by a piston rod 14. A stuffing-box 15 prevents back feed of air between the piston rod 14 and the opening of the pump body in which said piston rod slides.

The adjustable crank-pin 10 which can be moved to and fro with respect to the disc-crank 9 makes it possible to increase or to reduce the volume of the liquid discharged by every evolution of the piston, that is, to increase or to reduce the output of the apparatus in order to adapt the latter, for instance, to the output of the filling machine or any other apparatus which is possibly to be fed by the apparatus.

It is well known, more particularly for fermentable liquids as fruit juices, for instance, that it is indispensable that the apparatuses intended for the treatment of said liquids can be disassembled readily and rapidly in view of their cleaning immediately after their use. For this purpose, the pump body 5 has been divided into two parts namely, the cylinder $a$, $b$ and its foot $g$. The cylinder $a$, $b$ rendered fast with the vat 1 is secured to the foot $g$ removably and in such a manner that the removal of the vat 1 and of the cylinder $a$, $b$ attached to it exposes: the piston 6, the piston rod 14 and the inner of the delivery chamber $e$, thus permitting an easy access to all these members or member parts for their cleaning.

A rapidly removable nut 16 permits the disassembly of the pipe branch 17 and also access to the flap valve 7 and the cleaning of the part on the downside of said valve. The vertical and upward arrangement of said pipe branch 17 is also to be noted, for it permits constantly to maintain in said pipe branch a column of liquid opposing back feed of air into the pump body and thus doubling the effect of the flap valve 7.

The maintenance of the liquid at a suitable level in the vat 1 is insured by known means such as, for instance, a float 18 connected to a circuit-breaker 19 itself connected in turn with a contact-maker adapted for cutting off the supply of the liquid. Likewise, the apparatuses fed by the deaerator can be connected electrically with the motor of the latter in order that the deaerator stops as soon as its output exceeds that of the apparatus which is fed by the same.

Always for the purpose of insuring a rapid and ready cleaning:

On the one hand, the cover 20 of the vat 1 can be removed instantaneously and it carries therewith the cup 4 for the distribution of the liquid to be deaerated.

On the other hand, the piston 6 can be made in two pieces and secured by a cap 21 threaded onto the piston rod 14, this arrangement offering, furthermore, the advantage that it permits the obtaining of pieces showing no unevenness capable of retaining liquid drops which could ferment ulteriorly.

The valve 22 has for its purpose to suck out of the vacuum vat 1 the air separated from the liquids to be deaerated. The arrangement of its opening $h$ located at the upper part and close by the cover of the vat has for its purpose to prevent particles of liquid to be sucked in together with the air which said liquids contain. If advisable, baffles can be provided, although this does not dispense with the arrangement, before the pump in the direction of the flow, of a security vessel preventing the access to said pump for particles of the liquid to be deaerated.

Among the other features of the apparatus which forms the subject-matter of the invention the following are still to be noted:

The arrangement of the pump body and of the discharging piston which permits dispensing with every valve in the vacuum vat or in the pump without the risks of back feed of air.

Also, the arrangement for the discharge of the deaerated liquid by means of the piston which through a simple thrust effected by the latter reduces the risks of a back feed of the air.

The arrangement of the apparatus on the outlet side for the liquid permits the draining of the same with the utmost facility before it is disassembled for being cleaned.

As already mentioned, the distributing member the purpose of which is to cause the liquid to fall down can be made preferably: either in the form of a cup, as shown in Figure 1, or as a chamber or hollow piece, as shown in Figures 2, 3, 4 and 5.

The falling of the liquid in one or more very thin films is a condition which is exceedingly favourable for the obtaining of a rapid and effective deaerating of the liquid, for such a film, which practically has no thickness and falls through a vessel which is constantly evacuated, abandons immediately the air or any other gas which it contains.

Now, the chamber 23 shown in Figures 2 and 3 comprises beneath its lower face a slot 24 the width of which can be made as small as possible. As this chamber receives the liquid under pressure through the piping 25 said liquid is forced to escape downwardly through said slot in a film which is the thinner the narrower the slot is made.

In said chamber 23 a single slot of a circular shape is provided. But slots of any shape and in any number can be provided and Figures 4 and 5 show another arrangement comprising a chamber 26 with multiple rectilinear slots.

In certain cases, it is desirable to avoid or to attenuate the pulsations of the piston pump 6 in order that the discharged liquid enters the apparatuses located on the downside of the deaerator in a substantially continuous and regular current.

According to another feature of the invention this result is obtained by discharging the deaerated liquid into a bell-shaped buffer receiver under conditions such that the discharged liquid compresses a gas in said receiver before it escapes from the latter in a regularized discharge.

The liquid deaerator comprises at its outlet for the deaerated liquid: an anti-pulsating device comprising two substantially vertical pipings carrying each a gate, both said pipings being connected in their upper part with a bell-shaped buffer receiver and the liquid discharged by the volumetric pump of the deaerator being delivered into one of said pipings and issuing through the other piping after having compressed the gas in the bell-shaped buffer receiver.

Furthermore, the bell-shaped buffer receiver can comprise a nozzle or the like which permits to evacuate said receiver and to introduce into the same a gas under pressure other than air.

In Figure 6 which shows the anti-pulsating device, 7 is the non-return valve at the outlet of the deaerator; 32 is a piping for the outflow of the deaerated liquid which is connected with the pipe-branch 17; 33 is the bell-shaped buffer receiver containing a gas under pressure; 34 is a pressure gauge or pressure indicator and 35 is a nozzle with a cock valve for the eventual admission into the receiver 33 of a gas other than air.

36 is the second piping for the discharge of the deaerated liquid; 37 is a gate permitting a very progressive regulation of the output of the piping 36. Another gate 38 is mounted in the piping 32.

The device operates as follows: The deaerated liquid is discharged out of the deaerator under the pressure insured by the volumetric piston pump 5 of said deaerator. On rising in the piping 32 said liquid enters the bell-shaped buffer receiver 33 and compresses the gas contained in the upper part of said receiver. The liquid flows out under pressure through the piping 36 but said outflow is controlled by means of the gate 37.

This control, which is made on the beginning of the operation, must be sufficient during the whole time of the working of the apparatus, provided that the output of the pump is regular.

The starting is effected as follows: The gate 37 being closed and the gate 38 open, the deaerator is started and works until the liquid rising in the bell-shaped buffer receiver 33 also causes the pressure to rise in said receiver while compressing the gas contained therein.

When the pressure gauge 34 indicates the desired number, the gate 37 is progressively opened until its output is equal to that of the pump of the deaerator. Then the index of the pressure gauge is stabilized.

In case the air were to be substituted by another gas the gates 37 and 38 are closed, the whole liquid having been drawn out of the device; the nozzle 35 is connected with the vacuum pump and its cock valve is opened. When the air has been drawn out of the bell-shaped buffer receiver the cock-valve of the nozzle 35 is closed, the nozzle is connected with the gas cylinder containing the gas which is to replace the air and the cock valve of the nozzle is opened again in order to permit the introduction of the gas into the receiver 33, then the operation is the same as already described for starting the device.

Of course, various modifications can be made and the use of equivalent means can be considered without departing from the scope and spirit of the invention.

We claim:

1. Apparatus for disaerating liquids, comprising a closed vacuum vat having a cover, a distributing member located inside the said vat and in the upper part of the latter, an inlet pipe for delivering the liquid to the said distributing member, an outlet pipe located near the cover of the said vacuum vat for exhausting the air given off from the liquid, a pump body having the upper part thereof located interiorly of the vacuum vat and the lower part thereof located exteriorly of the vat, said pump body having openings in the upper part disposed at the level of the bottom of the vacuum vat, a piston reciprocating in the said pump body, a delivery pipe communicating with the lower part of the said pump body, and a spring loaded valve adapted to close the delivery pipe during the up stroke of the piston.

2. An apparatus as claimed in claim 1 wherein the pump body is fixed with respect to the vat and closed at its lower end by a frame forming a guide for the piston.

3. An apparatus as claimed in claim 1 wherein the upper end of the outlet pipe is turned upwardly and terminates in close proximity to the underside of the vat cover.

4. An apparatus as claimed in claim 1 provided with an inverted cup member, said inlet pipe being turned upwardly and located below said cup member.

5. An apparatus as claimed in claim 1 provided with a circular distributing chamber connected with the inlet pipe and provided with a narrow peripheral slot in the lower portion thereof.

6. An apparatus as claimed in claim 1 provided with a circular distributing chamber connected with the inlet pipe and having narrow straight slots in the underside thereof.

7. An apparatus as claimed in claim 1 provided with an antipulsating device connected with the delivery pipe, means for evacuating said device, and means for introducing a gas other than air to said device.

JEAN GORGERAT.
RENÉ DÉTREZ.

REFERENCES CITED

The following references are of record in the file of this patent:

UNITED STATES PATENTS

| Number | Name | Date |
|---|---|---|
| 512,534 | Bleach | Jan. 9, 1894 |
| 588,215 | Borie | Aug. 17, 1897 |
| 1,095,463 | Kieser | May 5, 1914 |
| 1,981,965 | Morgan | Nov. 27, 1934 |
| 2,071,393 | Doherty | Feb. 23, 1937 |
| 2,283,439 | Herman | May 19, 1942 |
| 2,358,412 | Muller et al. | Sept. 19, 1944 |

FOREIGN PATENTS

| Number | Country | Date |
|---|---|---|
| 16,399 | Great Britain | 1913 |